(12) United States Patent
Kobayashi et al.

(10) Patent No.: US 7,822,242 B2
(45) Date of Patent: Oct. 26, 2010

(54) IMAGE PROCESSING APPARATUS FOR REDUCING NOISE FROM IMAGE

(75) Inventors: Tadaharu Kobayashi, Otawara (JP); Miwa Okumura, Kuroiso (JP)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 1002 days.

(21) Appl. No.: 10/777,681

(22) Filed: Feb. 13, 2004

(65) Prior Publication Data

US 2004/0159812 A1 Aug. 19, 2004
US 2007/0145317 A9 Jun. 28, 2007

(30) Foreign Application Priority Data

Feb. 13, 2003 (JP) .............................. 2003-035727

(51) Int. Cl.
 *G06K 9/00* (2006.01)
(52) U.S. Cl. ..................................... 382/128
(58) Field of Classification Search ................. 382/132, 382/218, 260, 264, 131, 128; 600/410; 378/98.2
 See application file for complete search history.

(56) References Cited

U.S. PATENT DOCUMENTS

| | | | | |
|---|---|---|---|---|
| 4,794,531 A | * | 12/1988 | Morishita et al. | ............ 382/132 |
| 5,018,179 A | * | 5/1991 | Kaneko | .................... 378/98.12 |
| 5,111,285 A | * | 5/1992 | Fujita et al. | ................. 358/500 |
| 5,602,934 A | * | 2/1997 | Li et al. | ........................ 382/128 |
| 5,732,697 A | * | 3/1998 | Zhang et al. | ................ 600/300 |
| 5,809,105 A | | 9/1998 | Roehm et al. | |
| 5,875,268 A | * | 2/1999 | Miyake | ....................... 382/276 |
| 6,016,356 A | * | 1/2000 | Ito et al. | ...................... 382/132 |
| 6,724,942 B1 | * | 4/2004 | Arai | ........................... 382/254 |

(Continued)

FOREIGN PATENT DOCUMENTS

JP 09-000511 * 1/1997

(Continued)

OTHER PUBLICATIONS

Rey-Sem Lin, et al., "Some Modifications of Gradient Weighted Filters[1]", Journal of Visual Communication and Image Representation, vol. 10, No. 4, XP-002325370, Dec. 1999, pp. 336-350.

(Continued)

*Primary Examiner*—Samir A. Ahmed
*Assistant Examiner*—Jayesh Patel
(74) *Attorney, Agent, or Firm*—Oblon, Spivak, McClelland, Maier & Neustadt, L.L.P.

(57) ABSTRACT

An image processing apparatus is provided for reducing noise from an original image consisting of digital image data. The apparatus has an information calculator, smoothed image producer, weighting-factor calculator, and weighting adder. The information calculator calculates information in relation to a pixel-value change representing a degree that becomes larger with a spatial change in a pixel value averaged each predetermined area on the original image. The smoothed image producer produces a smoothed image by smoothing the original image. The weighting-factor calculator calculates a weighting factor depending on the calculated information in relation to the pixel-value change. The weighting adder mutually performing, using the weighting factor, weighting addition with either the original image or an image modulated from the original image and the produced smoothed image.

16 Claims, 10 Drawing Sheets

U.S. PATENT DOCUMENTS

| | | | | |
|---|---|---|---|---|
| 6,760,611 | B1* | 7/2004 | Watanabe | 600/410 |
| 6,778,692 | B1* | 8/2004 | Yazici | 382/132 |
| 7,039,236 | B2* | 5/2006 | Hashimoto et al. | 382/218 |
| 2002/0150304 | A1* | 10/2002 | Ockman | 382/260 |
| 2004/0073112 | A1* | 4/2004 | Azuma et al. | 600/437 |

FOREIGN PATENT DOCUMENTS

JP          2002-374418          12/2002

OTHER PUBLICATIONS

Xin Wang, "On the Gradient Inverse Weighted Filter", IEEE Transactions on Signal Processing, vol. 40, No. 2, XP-000292345, Feb. 1, 1992, pp. 482-484.

Xiaoyin Xu, et al., "Adaptive Difference of Gaussians to Improve Subsurface Object Detection Using GPR Imagery", Proceedings 2002 International Conference on Image Processing, vol. 2, XP-002325371, Sep. 25, 2002, pp. II-457-II-460.

David C. C. Wang, et al., "Gradient Inverse Weighted Smoothing Scheme and the Evaluation of its Performance", Computer Graphics, and Image Processing, vol. 15, No. 2, XP-002011463, Feb. 1981, pp. 167-181.

Gary A. Mastin, Adaptive Filters for Digital Image Noise Smoothing: An Evaluation, Computer Vision, Graphics, and Image Processing, vol. 31, No. 1, XP-008037692, Jul. 1985, pp. 103-121.

M. K. Mannudeep, et al., Radiology, vol. 228, No. 1, pp. 251-256, "Low-Dose CT of the Abdomen: Evaluation of Image Improvement With Use of Noise Reduction Filters-Pilot Study", Jul. 2003.

M. K. Mannudeep, et al., Radiology, vol. 228, No. 1, pp. 257-264, "Can Noise Reduction Filters Improve Low-Radiation-Dose Chest CT Images? Pilot Study", Jul. 2003.

E. Barnes, Auntminnie.com, 4 pages, "New Approaches Aid CT Perfusion for Ischemia", May 23, 2003.

* cited by examiner

IMAGE PROCESSING APPARATUS FOR REDUCING NOISE FROM IMAGE

BACKGROUND OF THE INVENTION

1. Technical Field

The present invention relates to an image processing apparatus and an image processing method for reducing noise on an image, and in particular, to an image processor and an image processing method for reducing noise from various digital images, such as medical digital images acquired by medical modalities.

2. Related Art

It is general that various types of noise are mixed on images acquired based on natural events. This noise is often given a generic name, called "image noise." For higher-quality images, how to remove or reduce the image noise always lies as a significant technical subject.

In particular, image noise mainly made up of high-frequency signal components often exists on an image. In such an image, the image noise frequently becomes an obstacle to viewing structural objects to be targeted on an image (in medical images, the objects are for example born portions) under a superior visibility and a higher density resolution. That is, the visibility and density resolution are deteriorated badly. For example, for viewing a medical image, a deterioration in the visibility and/or density resolution makes it difficult to find out a tumor in soft tissue.

As reducing image noise, there have been known a technique for using a smoothing filter, a technique for making use of a statistical characteristic inherent to noise, and a technique for adjusting a gain in a frequency space.

However, the current situation is that the above image noise reduction techniques have still been poor in achieving a satisfactory noise reduction.

For instance, in cases where the technique for using a smoothing filter is employed, it is possible to remove or reduce image noise made up of high frequency signal components, but there arises a problem that the spatial resolution is lowered as well. This problem is attributable to the fact that regions on the image, such as boundaries of structural objects, which include much high frequency signal components, are smoothed as well. That is, simply, the image gets "blurred," which results in a situation that contradicts the noise reduction effect.

Further, using the statistical characteristic of noise faces a problem that it is difficult to detect the statistical characteristic in advance and it is also difficult to perform real-time processing for the noise reduction. On the other hand, the technique for adjusting the gain in the frequency space has a difficulty in selectively removing only noise. This difficulty leads easily to the appearance of artifacts on filtered images.

SUMMARY OF THE INVENTION

The present invention has been made with due consideration to the foregoing difficulties, and an object of the present invention is to provide an image which is less in noise as a whole and which is excellent in the visibility and density resolution for objects to be observed, such as structural objects, by removing or reducing, without fail, image noise mainly made up of high frequency signal components and by keeping, in a sure manner, pixel-value information about significant areas in observing the image, such areas being the boundaries of structural objects or others and containing a great deal of high frequency components.

In order to accomplish the above object, as one aspect of the present invention, there is provided an image processing apparatus for reducing noise from an original image consisting of digital image data. The apparatus comprises an information calculator, a smoothed image producer, a weighting-factor calculator, and a weighting adder. Of these elements, the information calculator calculates information in relation to a pixel-value change representing a degree that becomes larger with a spatial change in a pixel value averaged every predetermined area (for example, 3×3, 5×5 or 7×7 pixels) on the original image. The smoothed image producer produces a smoothed image by smoothing the original image, and the weighting-factor calculator calculates a weighting factor depending on the calculated information in relation to the pixel-value change. The weighting adder mutually performs, using the weighting factor, weighting addition with either the original image or an image modulated from the original image and the produced smoothed image.

Accordingly, as the information in relation to a pixel-value change, regions at which the pixel value changes largely are calculated and extracted. The regions, for example, include the contours of structural objects on an image. Meanwhile, a smoothed image produced by smoothing an original image has less noise of which main constituents are high-frequency signal components. Hence a weighting coefficient is calculated based on the information about the pixel-value change in such a manner that the larger the pixel-value change in each predetermined-size area, the higher the weighting coefficient to be given to an original image from the area.

The weighting coefficients are used to perform weighting addition between either the original image or an image modulated from the original image and the smoothed image. This weighting addition is able to enhance, area by area, either the original image (or its modulated image) or the smoothed image. By way of example, in regions where there is plenty of high-frequency signal components, such as the contour portions of structural objects, the pixel value on the original image (or its modulated image) is enhanced. On the other hand, in regions where there is less spatial change in a pixel value (averaged over each predetermined-size area), a pixel value on the smoothed image with less image noise is enhanced. That is, calculating the weighting factors depending on the pixel-value change information makes it possible to provide a weighting-added image in which the advantageous pixels selected from both the original image (or its modulated image) and the smoothed image are mapped area by area.

This weighting-added image is therefore made up of the pixels properly selected from either the original image (or its modulated image) or the smoothed image, depending on pixel information of which image should be given the priority. Hence, as the entire image, image noise can be removed or reduced with steadiness. Further, pixel-value information in significant portions such as boundary portions of structural objects (where there are plenty of high-frequency signal components) on an image can be kept steadily, and an image with less noise and with excellent visibility can be provided.

The remaining typical configurations, which fall into the above main configuration, are as follows.

By way of example, the information calculator comprises a filtering unit respectively applying two smoothing filters of mutually different filtering factors to the original image respectively, thereby producing two smoothed output images and a subtraction unit performing mutual subtraction, pixel by pixel, between the two output images, thereby producing a difference image serving as the information in relation to the pixel-value change.

It is also preferred that the information calculator comprises a filtering unit respectively applying two smoothing filters of mutually different filtering factors to the original image respectively, thereby producing two smoothed output images, a subtraction unit performing mutual subtraction, pixel by pixel, between the two output images, thereby producing a difference image serving as the information in relation to the pixel-value change, and an absolute-value calculator calculating an absolute value of each pixel value of the difference image, thereby producing an absolute-value image serving as the information in relation to the pixel-value change.

Preferably, the filtering factors of the two smoothing filters are defined based on an algorithm that the larger the absolute value of each pixel value of the difference image, the larger the spatial change in the pixel value averaged every predetermined area on either the original image or an image modulated from the original image.

The smoothed image producer may be configured to use, as the smoothed image, one of the two output images smoothed by the filtering unit.

It is preferred that the weighting coefficient calculator is configured to calculate the weighting coefficient defined by a non-decreasing function of an absolute pixel value on the difference image, the weighting coefficient having a non-negative value.

It is also preferred that the weighting adder is configured to perform the weighting addition based on an equation of $$W(m,n)=A\cdot X(m,n)+(1-A)\cdot X1(m,n),$$

wherein the weighting factor is A, a pixel position is (m,n), either the original image or the image modulated from the original image is X(m,n), the smoothed image is $X1(m,n)$, and an image subjected to the weighting addition is W(m,n).

The original image is a two-dimensional or a three-dimensional digital image. The original image is a monochrome digital image.

There is also provided a program, which is readable by a computer, for allowing the computer to function as the above image processing apparatus for reducing noise from an original image consisting of digital image data.

Another aspect of the present invention is a method of reducing noise from an original image consisting of digital image data, the method comprising the steps of: applying to the original image two smoothing filters having mutually different filtering factors, respectively, to produce two smoothed images; performing a mutual subtraction between the two smoothed images pixel by pixel to produce a difference image; calculating a weighting factor depending on either the difference image or an image derived from the difference image; and performing, using the calculated weighting factor, a mutual weighting addition between the original image and either one of the two smoothed images.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, an embodiment of the present invention will now be described. The embodiment is directed to an image processing apparatus, by which the image processing method according to the present invention is carried out as well.

Figure 1:
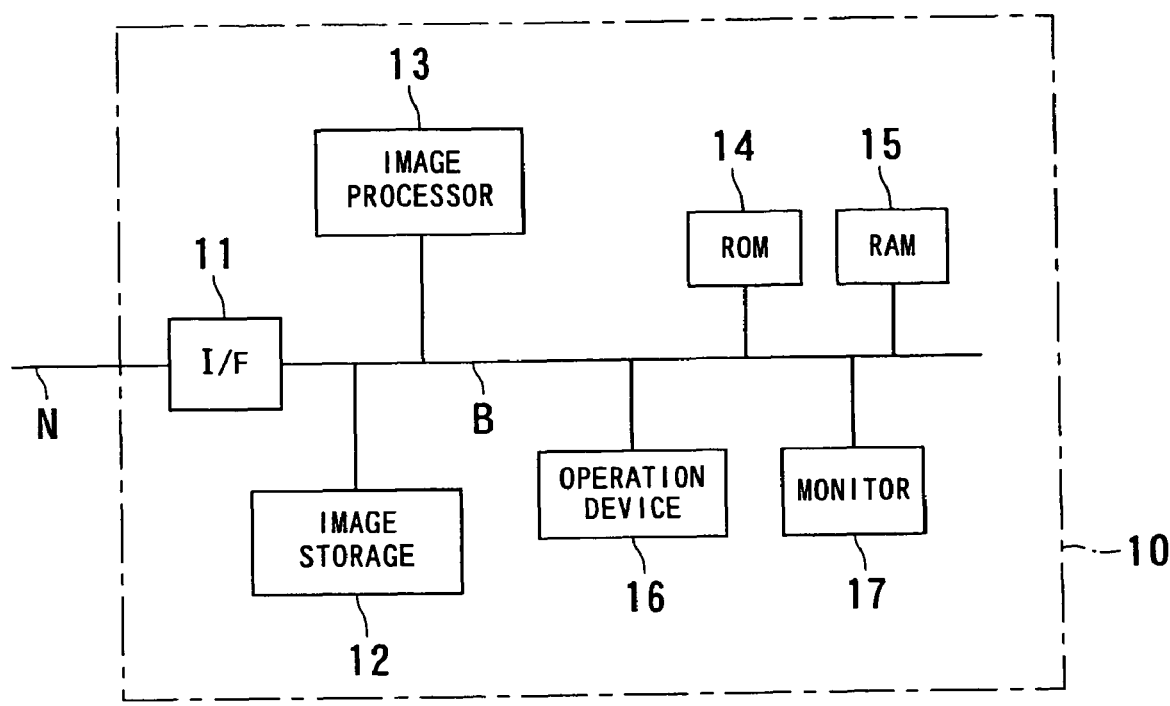
FIG. 1 is a block diagram functionally showing the configuration of an image processing apparatus according to an embodiment of the present invention.

As shown in FIG. 1, an image processing apparatus 10 according to the present embodiment is provided. The apparatus 10 is coupled with a medical modality (not shown) via a network N, the modality being configured to acquire monochrome two- or three-dimensional digital images.

This image processing apparatus 10 is provided with the hardware functioning as a computer. Based on a program installed in the hardware, software processing is carried out to functionally construct an image processing apparatus capable of remarkably reducing noise from images.

Practically, the image processing apparatus 10 is equipped with an interface 11 connected to the network N and various units connected to a bus B connected to the interface 11. The units include an image storage 12, an image processor 13 for noise reduction, a ROM 14, a RAM 15, an operation device 16, and a monitor 17.

In the image storage 12, monochrome digital image data, which have been acquired by such medical modalities as an X-ray CT scanner, a diagnostic ultrasound apparatus, and a magnetic resonance imaging system, are stored. Upon being activated, the image processor 13 reads out a program for noise reduction from the ROM 14, stores it in a work memory of the processor 13, and performs processing based on the read-out program. The program for noise reduction, which has been written according to the present invention, is previously been stored in the ROM 14. The processing is thus directed to noise reduction mainly featuring the present invention and carried out as outlined in FIG. 2 which will be detailed later. A predetermined noise-reduction program is memorized in advance in the ROM 14.

The RAM 15 is used by the image processor 13 as a temporary-storing memory necessary for processing noise reduction. The operation device has for example a keyboard and/or a mouse, which are used by an operator to give necessary information to the image processing apparatus 10. Under the control of the image processor 13, the monitor 17 visualizes images and various types of information concerning with the noise reduction processing.

The hardware configuration of this image processing apparatus 10 can be modified into various ways. This apparatus 10 is not always limited to being connected to a medical modality via the network N as described. Instead, the image processing apparatus 10 can be configured into a standalone type of apparatus. In addition, though this apparatus 10 is configured to receive image data acquired by a medical modality and then to perform the noise reduction processing in the form of offline processing, this is not a definitive list. By way of example, the entire functions of this apparatus 10 can be installed into a medical modality itself, so that the noise reduction processing is performed with acquired digital image data almost in real time.

Furthermore, though the image processing apparatus 10 has the configuration of reducing image noise through the software processing, this apparatus 10 is not restricted to such a manner, but can be configured using digital circuitry such as logic circuits.

In connection with FIGS. 2 to 11, the processing for image noise reduction according to the present embodiment will now be explained.

Prior to the detailed explanation, an assumption is made such that two-dimensional monochrome digital image data have been beforehand stored in the image processor 12 and the noise reduction processing for the two-dimensional image data is performed.

Figure 2:
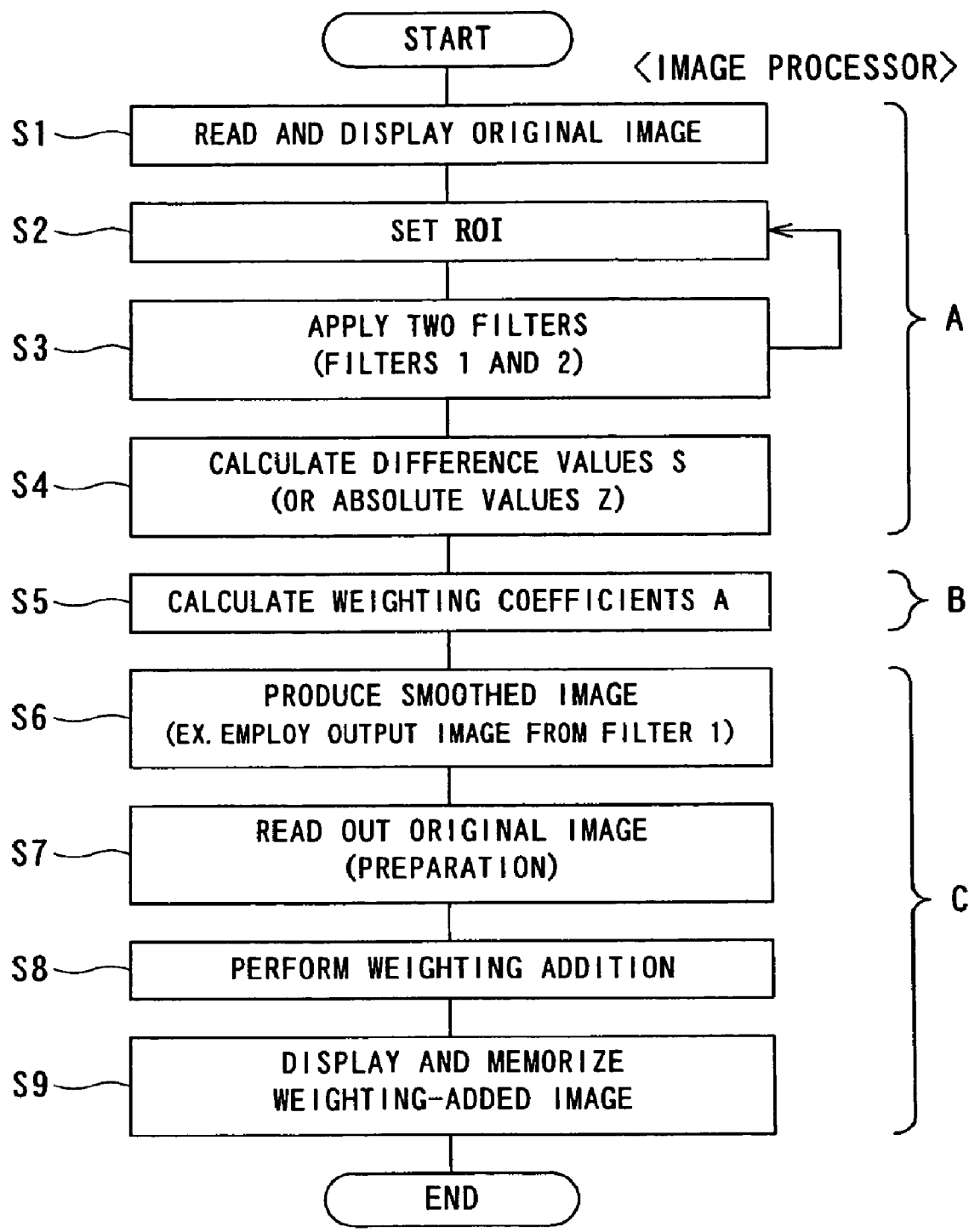
FIG. 2 is a flowchart outlining an example for noise removal processing executed by an image processing disposed in the image processing apparatus.

FIG. 2 shows a series of processes for reducing image noise, which are carried out by the image processor 13. This processing can be outlined such that it includes a processing step "A" to detect the boundary (edge) of a structural object on a digital image, a processing step "B" to calculate a weighting factor for weighting addition carried out between an original image and a smoothed image, and a processing step "C" to perform the weighting addition using the calculated weighting factor. The processing steps A to C will now be described in turn.

(Processing Step "A" for Detecting Boundary)

Figure 3A:
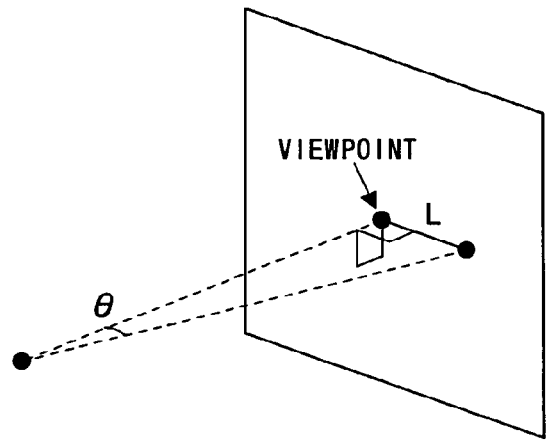
FIGS. 3A and 3B explain a human visual sensitivity.
Figure 3B:
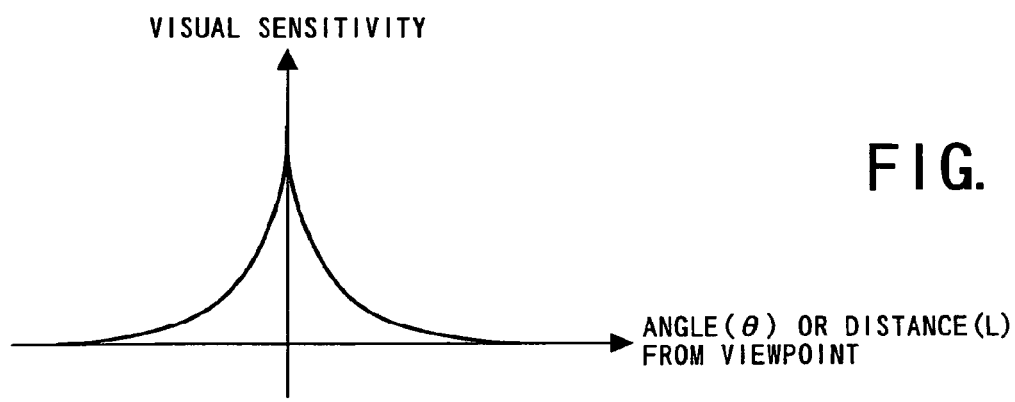

The human visual sensitivity has, as shown in FIGS. 3A and 3B, a characteristics in which the visual sensitivity decreasing gradually depending on an angle θ from a viewpoint. And if viewing a limited angular range of which angle θ is small, the human visual sensitivity can be approximated to sensitivity curves which are the same in profiles and which decrease gradually as a distance L extends from the viewpoint (refer to the lateral axis in FIG. 3B). Though the human visual sensitivity distributes, of course, two-dimensionally, FIGS. 3A and 3B are depicted as being a one-dimensional sensitively distribution along a specified direction. In addition, the present embodiment will be explained on the assumption that the same sensitivity distribution lies in all the directions, but this is not a definitive example. The sensitivity distribution may depend on the directions, so that, in such a case, the following processing may be carried out on condition that sensitivity distributions depend on directions.

Figure 4:
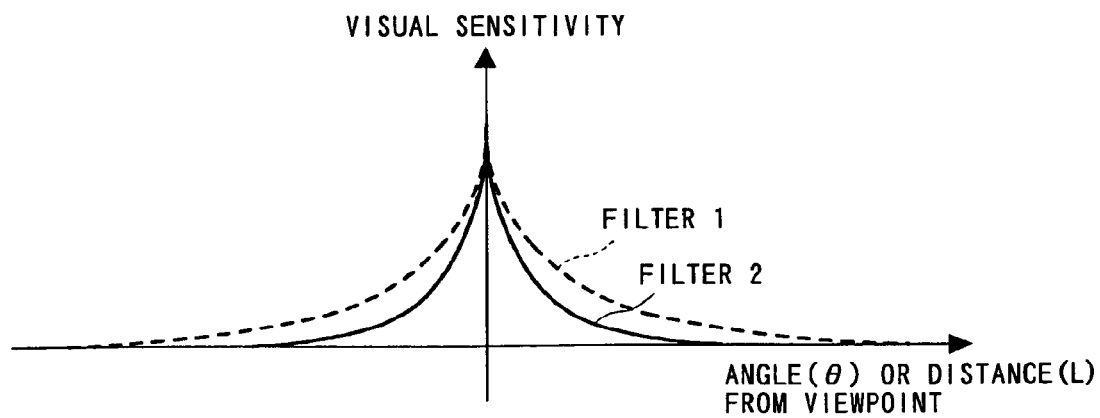
FIG. 4 conceptually explains sensitivity characteristics of two filters which are used in the embodiment, filtering factors of the two filters being different from each other.

In the present embodiment, as shown in FIG. 4, two visual sensitivity distributions, whose characteristics are different from each other, are used to detect "a region exhibiting a large change in a pixel value, such as boundary portions of structural objects" on a digital image. FIG. 4 shows only the profiles of the sensitivity characteristic curves, in which the values of a longitudinal axis (sensitivities) do not mean any particular physical quantity. Further, "a region exhibiting a large change in a pixel value" means a region in which there are considerable changes in the pixel value over a predetermined-size or more area on the image (i.e., a change in the pixel value of each pixel at which image noise exists is excluded from the concept of the above region).

To be specific, the image processor 13 receives information about operations given by an operator via the operation device 16, reads out from the image storage 12 data of a desired two-dimensional digital image (i.e., a monochrome image, which corresponds to the original image according to the present invention), and makes it display on the monitor 17 (step S1).

Figure 5:
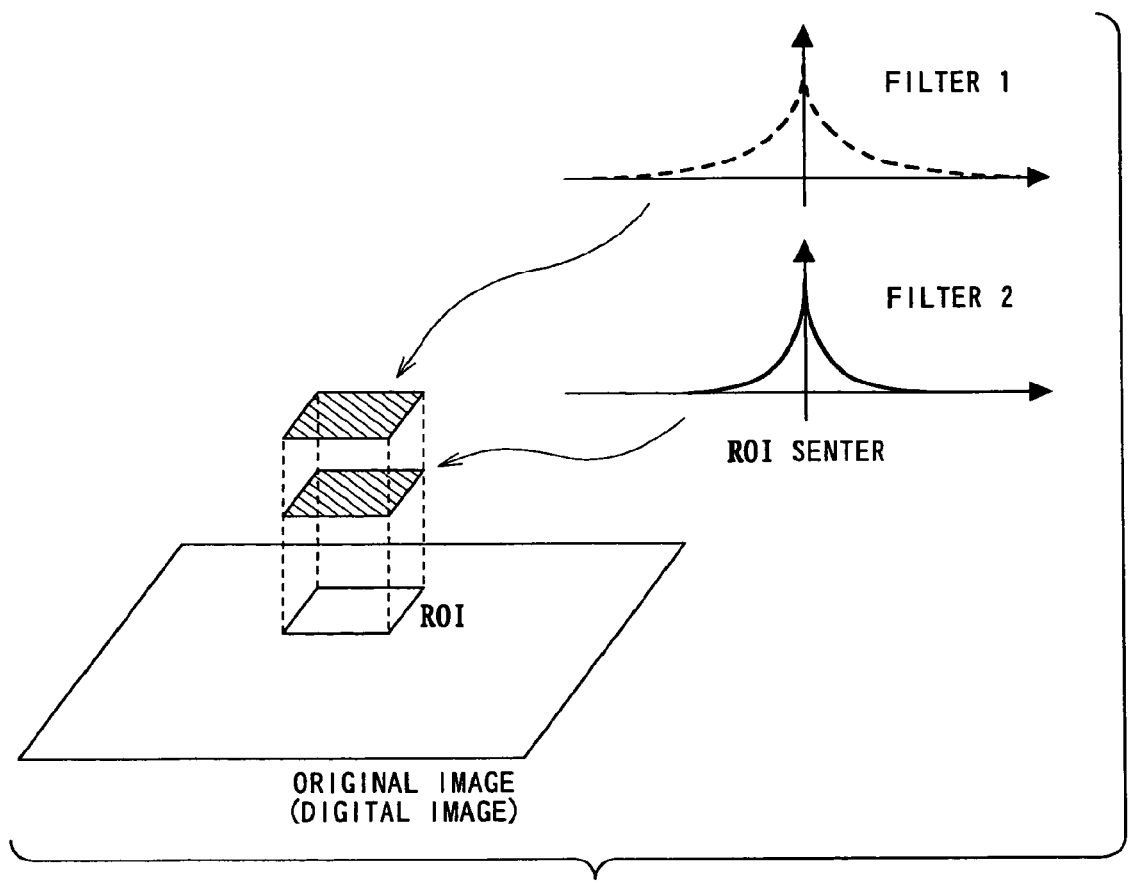
FIG. 5 explains application of the two filters to an original image (digital image), the filtering factors of the two filters being different from each other.
Figure 6:
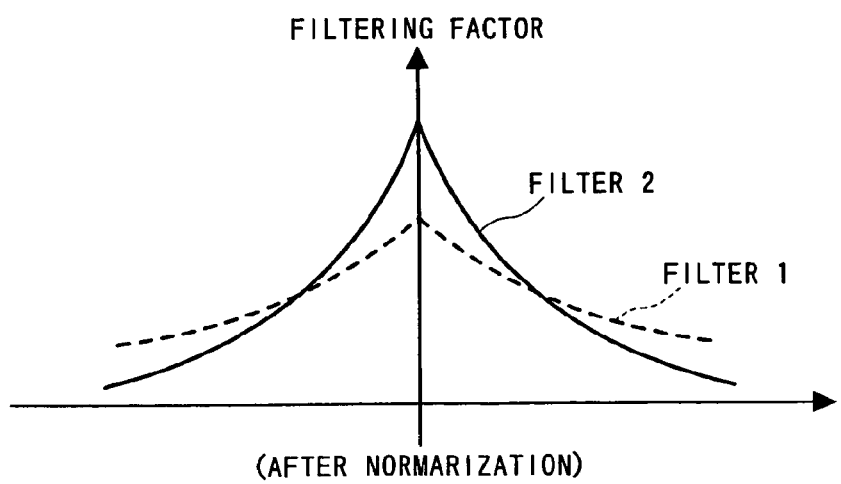
FIG. 6 conceptually explains normalized sensitivity characteristics of two filters of which filtering factors are different from each other.

Responsively to information about operations given by an operator via the operation device 16, the image processor 13 then operates to initially place a ROI (Region Of Interest) at an appropriately determined initial position on the digital image (step S2). This operation is illustrated in FIG. 5. The ROI has an appropriately determined dimension and shape. The dimension is for example 3×3, 5×5 or 7×7 pixels.

The image processor 13 then has two two-dimensional image filters applied to the ROI-specified region on the image, respectively (step S3). The two filters have mutually different filtering factors as shown in FIG. 4, for example. The position of the ROI is automatically moved every time of processing in response to a command issued from the image processor 13 (steps S3 to S2). This permits the filters to be applied to each region on the original image in a repeated manner, under the control of the image processor 13.

In the present embodiment, the foregoing two two-dimensional image filters will now be referred to as "filter 1" and "Filter" in the following explanations. In the example shown in FIG. 5, both of the filters 1 and 2 are described as rectangular two-dimensional filters, but the filters 1 and 2 are not limited to such a shape. Other shapes, such as circulars, may be applied to the filters 1 and 2. Alternatively, the filter 1 may be different in shape from the filer 2. Further, the size of the ROI may be changed filter by filter.

The filtering, which is executed by the filters 1 and 2, will now be explained in a more quantitative basis. Assume that $X(m, n)$ denotes a pixel value at each pixel position $(m, n)$ on a digital image to be processed, $k1(i, j)$ denotes filtering factors of the filter 1, $k2(i, j)$ (not equal to $k1(i, j)$) denotes filtering factors of the filter 2, and $(i, j)$ denotes each pixel position, respectively. Thus, each of the filters 1 and 2 performs moving average based on the following formula, and then outputs a smoothed pixel value $Y1(m, n)$ (or $Y2(m, n)$) every pixel position $(m, n)$.

(Smoothing Performed by Filer 1)

$$Y1(m,n) = \Sigma\{(k1(i,j) \cdot X(m-i, n-j))\} \quad (1)$$

(Smoothing Performed by Filer 2)

$$Y2(m,n)=\Sigma\{(k2(i,j)\cdot X(m-i,n-j))\} \qquad (2)$$

Figure 14:
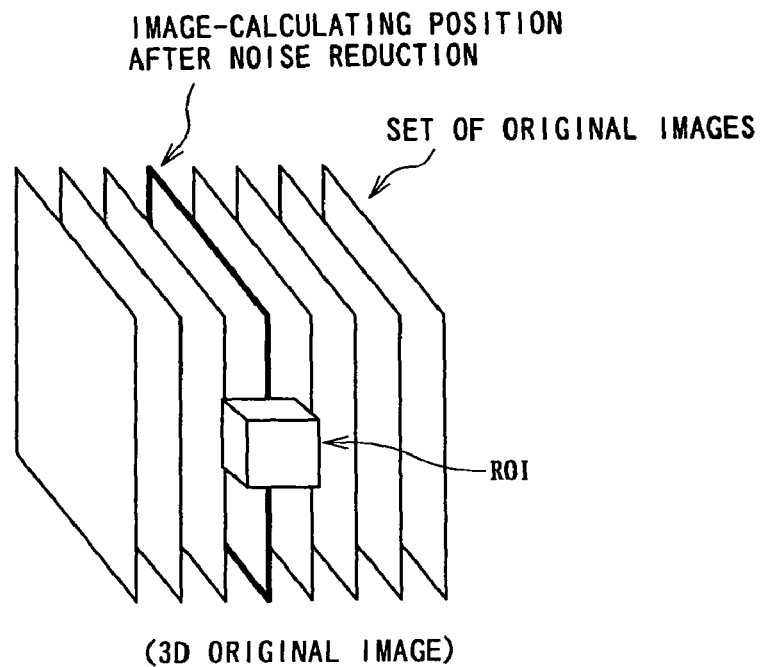
FIG. 14 is a conceptual illustration for applying noise reduction processing to a three-dimensional original image, which is according to a fourth modification of the embodiment.

The filtering factors k1 and k2 have, as shown in FIG. 4, sensitivity distributions which are different from each other and normalized as shown in FIG. 14.

Using images (smoothed image) formed by the pixels values Y1($m$, $n$) and Y2($m$, $n$) which are the outputs from the filters 1 and 2, the image processor 13 then calculates differences between the smoothed images (and absolute values of those difference values) at each pixel position (m, n) (step S4). Namely, the assumption is made based on the formals of:

(Difference Values)

$$S=Y1-Y2 \qquad (3)$$

(Absolute Values)

$$Z=abs(S) \qquad (4).$$

Hence, the difference values S compose a difference image, while the absolute values Z compose an absolute-value image. Those images correspond to the information in relation to a change in a pixel value, which is referred by the present invention.

The foregoing difference values S and the absolute values Z represent information about pixel values in "a region exhibiting large changes in the pixel values, such as boundary portions of structural objects" on a digital image. The reason is as below, in which one-dimensional filtering is exemplified for the sake of an easier understanding.

Figure 7:
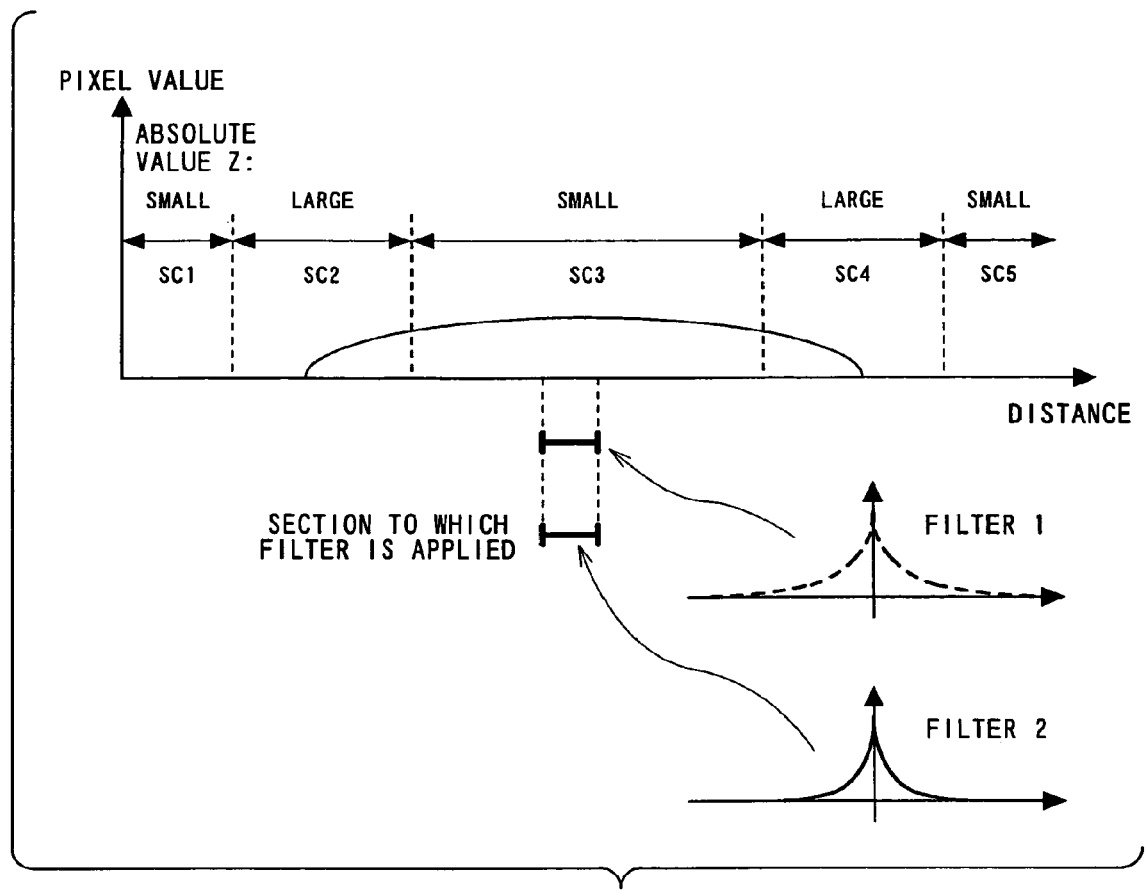
FIG. 7 pictorially shows, in a one dimension, the application of the two filters to the original image, the filtering factors of the two filters being different from each other.
Figures 8A, 8B:
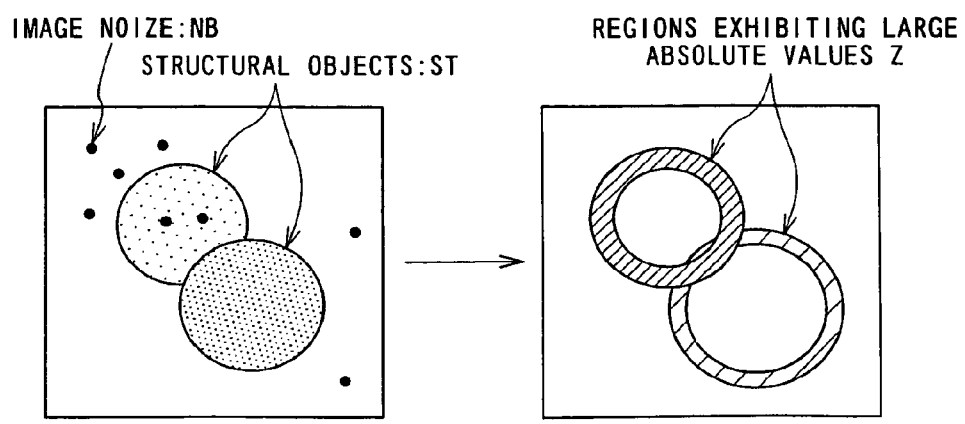
FIGS. 8A and 8B are illustrations for extracting information indicating the contours of structural objects by using the two filters.

FIG. 7 explains one-dimensional filtering simplified from the foregoing two-dimensional filtering. As shown, there are sections SC1, SC3 and SC5 each exhibiting relatively small pixel-value changes, while there are sections SC2 and SC4 each exhibiting relatively large pixel-value changes. Because each of the filters 1 and 2 is formed into one kind of moving average filter, the absolute values Z of difference values S in the respective sections SC1, SC3 and SC5 are relatively smaller than those in the respective sections SC2 and SC4. In addition, the filters 1 and 2 have the function of smoothing pixel values. Hence, even if image noise (mostly high-frequency signal components) lies on an original digital image (i.e., original image), the image noise has only the very small influence on the absolute values Z. Therefore, the difference values S or their absolute values Z are able to behave as information to distinguish "a region exhibiting large pixel-value changes" on a digital image from "the remaining region" thereof, and to express the boundaries (edges) of structural objects on the digital image (i.e., original image).

This means that, when the foregoing digital image is a medical image, the foregoing difference values S or their absolute values Z are able to exhibit contour information indicative of the boundaries of such structural objects as bones, along which changes in the pixel value is large.

(Processing Step "B" for Calculating Weighting Coefficient)

Then the image processor 13 shifts its processing step to the next, where weighting coefficients for weighting addition to be performed between the original image and the smoothed image are calculated (FIG. 2, step S5).

To be specific, this calculation of the weighting coefficients uses both the absolute values Z (or difference values S) and data of a non-decreasing function to the absolute values Z.

If a region on the digital image shows large absolute vales Z, the region exhibits a large pixel-value change on the image. In such a region, there exist the boundary portions of structural objects. For example, when being compared to an original image shown in FIG. 8A, hatched regions in FIG. 8B exhibit absolute values Z larger than those exhibited by the remaining region in FIG. 8B (, though the largeness relationship is relative between the images shown in FIGS. 8A and 8B). Thus, for the weighing addition between the original image and the smoothed image, the weighing coefficients are set as below. Weighting coefficients for the original image become larger than those for the smoothed image in regions each exhibiting a large pixel-value change, while weighting coefficients for the smoothed image become larger that those for the original image in the remaining region.

Figure 9:
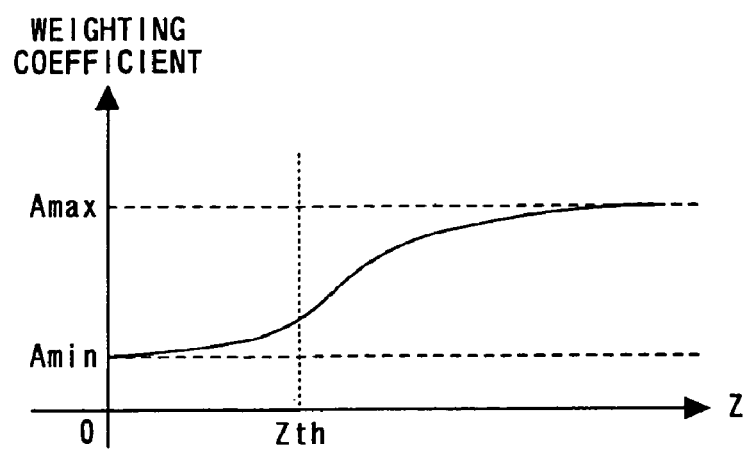
FIG. 9 is a graph exemplifying in a qualitative manner a weighting function for absolute values Z of difference values S calculated between output images from the two filters, the weighing function being employed by the embodiment.
Figure 10:
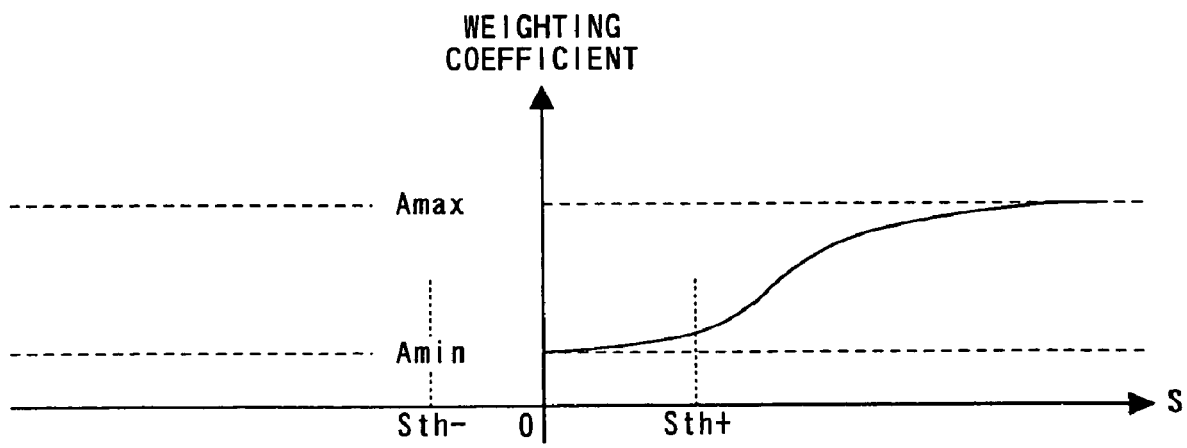
FIG. 10 is a graph exemplifying in a qualitative manner a weighting function for difference values S calculated between the output images from the two filters, the weighing function being employed by the embodiment.

In other words, the weighting coefficients "A" for the original image are set with reference to functions shown in FIG. 9 or 10.

Data indicative of these functions are previously stored in the ROM 14 as mathematical formulas. Hence whenever it is needed, the mathematical formulas may be used to compute the weighting coefficients "A." Alternatively, the amounts themselves of the weighting coefficients "A" according to the functions in FIG. 9 or FIG. 10 may be preserved in the form of a data table produced in the ROM 14. Making reference to the data table allows weighting coefficients "A" to be decided in advance.

FIG. 9 exemplifies a weighting function used in deciding weighting coefficients "A" with the use of absolute values Z. The weighting function gives to absolute coefficients "A" weighting coefficients "A" within a range of $$0 \leq A\min \leq A \leq A\max \leq 1.$$

More concretely, in this weighting function, the weighting coefficients "A" increase gradually from their minimum A=Amin as their absolute values Z increase, and then reach the vicinity of a threshold Zth set to the absolute values Z, at which the weighting coefficients "A" increase more sharply. The weighting coefficients "A" then continue increasing gradually to their maximum A=Amax.

Using this weighting function, some regions exhibiting small pixel-value changes on the original image are given lower weighting coefficients "A" and other regions exhibiting appropriate pixel-value changes falling in the vicinity of the threshold Zth are given weighting coefficients "A" that change sharply to emphasize the change.

A weighting function shown in FIG. 10 is used to decide weighting coefficients "A" based on the difference values S. This weighting function is able to provide weighting coefficients "A" to positive and negative ranges of the difference values S such that $$0 \leq A\min \leq A \leq A\max \leq 1.$$

Like the use of the absolute values Z, the weighting function based on the difference values S allows the weighting coefficients "A" to be given. Practically, in each of the positive and negative areas of the difference values S, as their absolute values increase, the weighting coefficients "A" gradually increase from their minimum A=Amin values to reach the vicinity of each of thresholds ±Sth, where the weighting coefficients "A" start to increase more sharply. The weighting coefficients "A" then return to a gradual increase to their maximum A=Amax.

In the case of using the difference values S, weighting functions can be set to predetermined positive and negative ranges of the difference values S independently of each other. FIG. 10 exemplifies the weighting functions that provide weighting coefficients different in rising inclinations from each other between the positive and negative areas of the difference values S. To be specific, the coefficients in the negative range are more sensitive to smaller difference values S (absolute values) compared to the positive range.

As described above, in each of the positive and negative areas of the difference values S, smaller weighting coefficients "A" can be assigned to some regions on the original image, when the regions exhibit small pixel-value changes. By contrast, if other regions exhibit pixel-value changes falling in the vicinity of each of the thresholds Sth+ and Sth−, appropriate weighting coefficients "A" changing sharply to emphasize the pixel-value changes can be assigned to the other regions.

The weighting function may be developed into further various ways, not limited to the examples shown in FIGS. 9 and 10. An example about the absolute values Z can be provided as follows. Weighting coefficients can rise linearly or stepwise from Z=0 to Z=predetermined value. Alternatively, weighting coefficients can rise sharply at Z=0 and then saturate gradually. A further alternative is that weighting coefficients are constant from Z=0 to Z=predetermined value (this can be illustrated in FIG. 9 such that a characteristic showing constant weighting coefficients "A" becomes a line). Accordingly, the weighting function adopted by the present invention is sufficient if the weighting coefficients do not decrease as the absolute values of the difference values S increase or as the absolute values Z themselves increase, which should be called "non-decreasing function."

(Processing Step "C" for Weighting Addition)

When the weighing coefficients "A" have been decided as described above, the processing at the image processor 13 is shifted to "weighting addition" for addition between the original image and the smoothed image with the use of the decided weighting coefficients "A"

Specifically, at first, to produce or obtain a smoothed image to be applied to the weighting addition, the image processor 13 reads out, from the image storage 12, data of the image smoothed by the filter 1, for example (step S6). This read-out image data is thus diverted from the smoothing purpose. The image smoothed by the filter 2 can also be used for this weighing addition. An image smoothed differently from the original image may also be used for the weighting addition. An image smoothed by any means other than the filters 1 or 2 can also be used.

The image processor 13 then reads out data of the original image from the image storage 12 for the purpose of weighting addition (step S7).

After this, the image processor 13 shifts its processing to weighting addition carried out at each pixel (m, n) so that a weighting-added image W is calculated (step S8). The weighting addition is carried out based on the following formula:

$$W(m,n)=A \cdot X(m,n)+B \cdot X1(m,n) \quad (5),$$

wherein X(m, n) denotes the original image, X1(m, n) denotes the smoothed image, "A" denotes weighting coefficients, and B denotes weighting coefficients (=1−A).

Data of the weighting-added image W is then stored into the image storage 12 and displayed on the monitor as an image (step S9).

Figure 11:
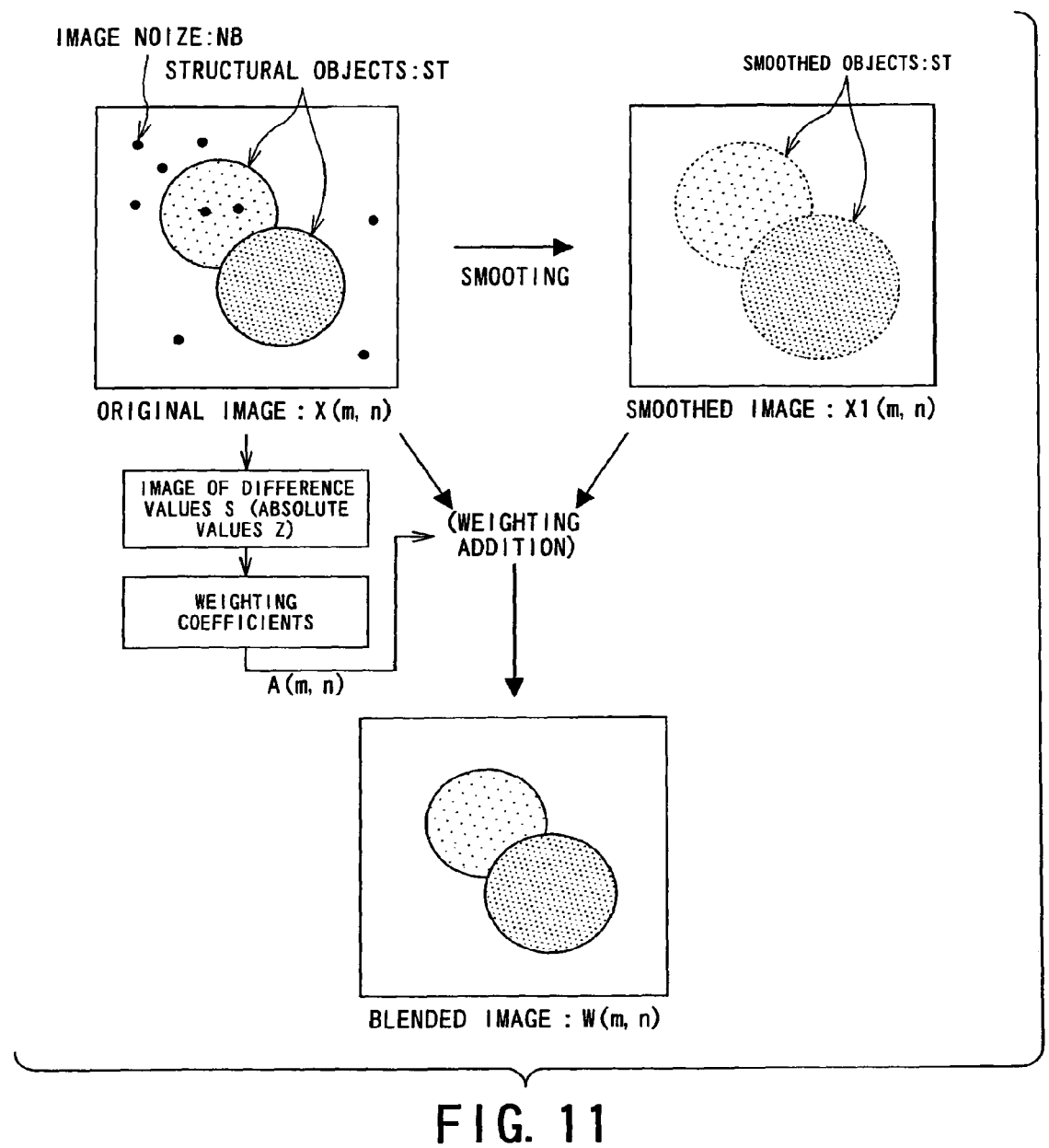
FIG. 11 conceptually explains a series of processes for reducing noise from the original image, the processes being carried out in the embodiment.

FIG. 11 explains a flow of steps of processing described above, together with some pictorial explanatory images. On an original image X(m, n) composed of a monochrome digital image, structural objects ST are pictured together with image noise NZ, as shown in FIG. 11(a). The smoothing on the filters 1 and 2 whose filtering factors are mutually different are applied to the original image X(m, n), respectively. Resultant smoothed images are then subjected to subtraction to produce difference values S (or their absolute values Z), which are then depicted as the contours of the structural objects (refer to steps S1 to S4 in FIG. 2). Then the difference values S or their absolute values Z are used to calculate a weighting coefficient A at each pixel (refer to step S5 in FIG. 2).

On the other hand, an smoothed image X1(m, n) is produced from the original image X(m, n) (refer to step S6 in FIG. 2). This smoothed image X1(m, n) has been subjected to moving average based on the filtering factors of one of the filters, so that the structural objects get blurred more than the original image X(m, n) but the image noise NZ is absorbed in blur components to be averaged. In other words, there is almost no image noise NZ on this smoothed image X1(m, n).

Especially the image noise NZ causing in "regions exhibiting smaller pixel-value changes," which becomes a visual obstacle in observation of such images as medical images, is deleted or reduced with steadiness.

The calculated weighting coefficients "A" is then used to perform the weighting addition between the original image X(m, n) and the smoothed image X1(m, n) pixel by pixel, as described before. This addition produces the weighting-added image W (refer to steps S7 and S8, and FIG. 11 (c)).

On this weighting-added image W, both the original image X(m, n) and the smoothed image X1(m, n) are mixed on the weighing addition basis using the locally optimized weighting coefficients. Hence, on the image W, such regions having larger pixel-value changes (i.e., regions having high-frequency signal components) as the contours of structural objects are depicted to emphasize corresponding pixel values on the original image X(m, n). In contrast, regions having smaller pixel-value changes (i.e., regions in which noise NZ is highly visible) are depicted to emphasize corresponding pixel values on the smoothed image X1(m, n). In other words, local optimization of the weighting coefficients enables the advantageous pixel values of both the original image X(m, n) and the smoothed image X1(m, n) to be mapped region by region in a skillful manner. As a whole, with high-frequency signal components at necessary pixels sill maintained surely, the image noise can be reduced remarkably.

In more plain words, the foregoing weighting coefficients "A" makes it possible that one or more regions each having larger pixel-value changes on the original image (which are for example the contours of structural objects) are expressed by pixel values giving more priority to the original image. On the other hand, the remaining region is expressed by pixel values giving more priority to the smoothed image. Thus depending on whether each localized region has a larger pixel-value change or not, the degree of enhancing pixel values is adjusted for the depiction. When a region consists of pixels of which spatial frequency is higher, the high-frequency signal component is maintained as high as possible. This gives not only a higher depiction to the contours of structural objects and others but also suppression of a high-frequency component to the remaining region so that the image noise is largely suppressed or removed. It is therefore possible to provide images of higher visibility for objects to be observed.

By the way, in the above weighting-added image W, the original image is more enhance in the vicinity of boundaries of structural objects. This means that there remains image noise in the vicinity of the boundaries. However, the human visual sensitivity responds more strongly to regions themselves of larger pixel-value changes such as the boundaries of structural objects. Thus the sensitivity represents a relatively lower level toward the image noise residing in the vicinity of boundaries of structural objects. Such image noise is scarcely an abstract to observing the image.

In the foregoing embodiment, the processing executed by the image processor 13 functionally constitutes the information calculator (corresponding to steps S1 to S4 in FIG. 2), the smoothed image producer (corresponding to step S6 in FIG. 2), the weighting-factor calculator (corresponding to step S5 in FIG. 2), and the weighting adder (corresponding to steps S7 to S9 in FIG. 2) of the present invention.

The foregoing embodiment can further modified into various modes, which will now be described.

First Modification

A first modification relates to simplifying the processing for calculating the weighing coefficients "A."

In the foregoing embodiment, both of the difference values S and the absolute values Z are calculated through individual applications of the filters 1 and 2 to acquire the respective smoothed images and mutual subtraction performed between the two smoothed images. This calculation can be more simplified by subtraction between the filtering factors, which is to be carried out in advance. That is, the subtraction is formulated as follows.

(As to Filtering Factors)

$$k3(i,j)=k1(i,j)-k2(i,j) \quad (6)$$

(As to Difference Values)

$$S(m,n)=\Sigma\{k3(i,j) \cdot X(m-i,n-j)\} \quad (7)$$

This previous calculation allows one time of filtering to produce the difference values S and their absolute values Z, thereby simplifying the processing.

Second Modification

A second modification is concerned with the configuration for the foregoing weighting addition.

Figure 12:
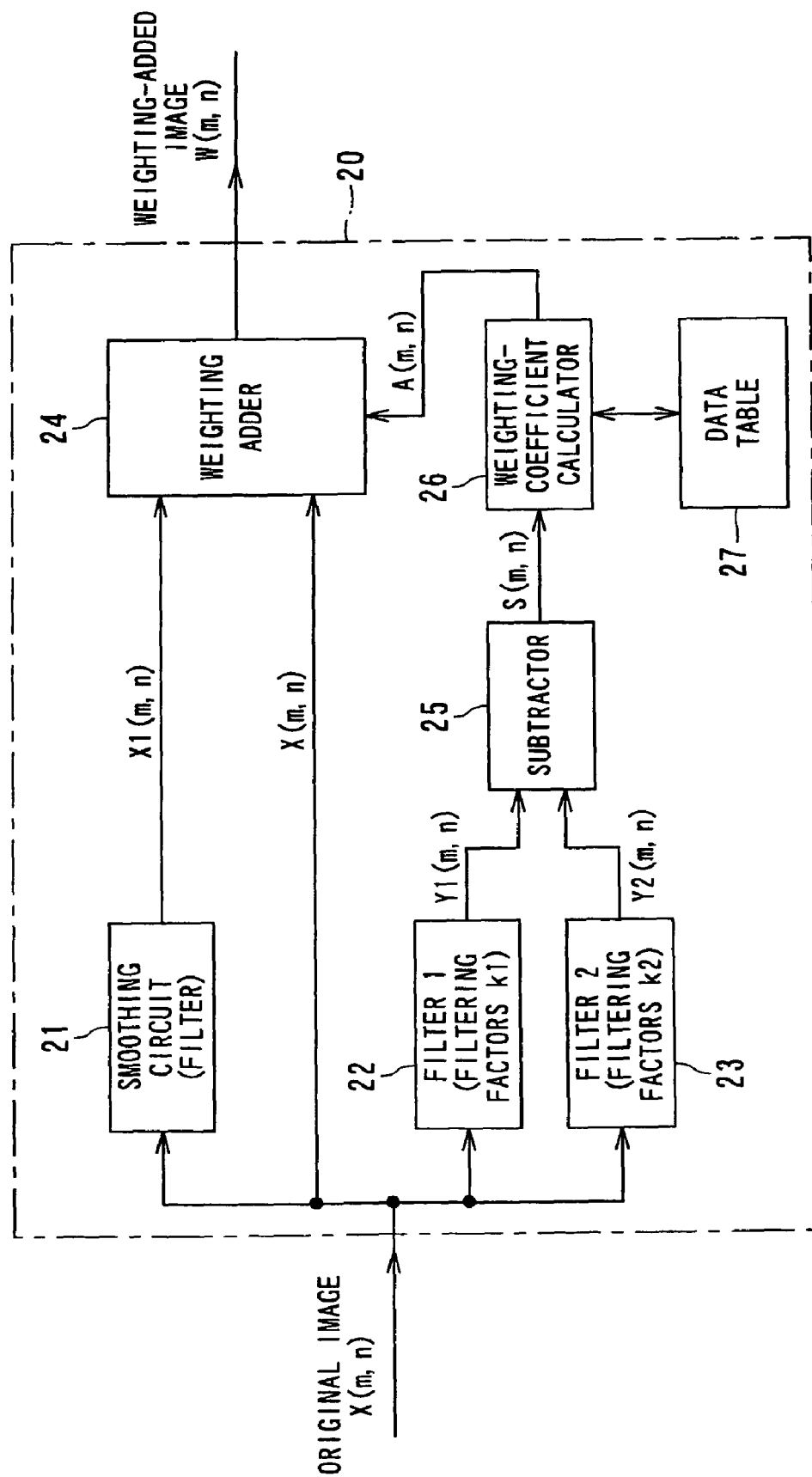
FIG. 12 is a functional block diagram showing the hardware configuration of an image processing apparatus according to a second modification of the embodiment.

In the foregoing embodiment, the weighting addition is performed by the image processor 13 through its software processing, but this is not a definitive list. Instead of the configuration for software processing, as shown in FIG. 12, the configuration on digital circuits including logic circuits can be used to form an image processing apparatus 20.

As shown, the image processing apparatus 20 is equipped with a smoothing circuit (i.e., filter) 21 receiving data of an original image X(m, n) consisting of a two-dimensional monochrome digital image and a first and second filters 22 and 23. Moreover, in the apparatus 20, the outputs of those circuits are connected to a weighting adder 24, a subtracter 25, a weighting coefficient calculator 26, and a data table 27, as shown therein.

The data of the original image X(m, n) is given to the weighing adder 24 as well. The smoothing circuit 21 applies to the inputted original image X(m, n) filtering at appropriately set filtering factors so that a two-dimensionally smoothed image X1(m, n) is produced. This image X1(m, n) is then sent to the weighting adder 24.

The first and second filters 22 and 23 (corresponding to the foregoing filters 1 and 2) apply, to the inputted original image X(m, n), moving average at appropriately selected filtering factors $k1(i, j)$ and $k2(i, j)$, respectively. This processing produces two-dimensionally smoothed images Y1(m, n) and Y2(m, n), respectively (refer to the formulas (1) and (2)). The filtering factors $k1(i, j)$ and $k2(i, j)$, which are given to the first and second filters 22 and 23, are differentiated from each other, like the foregoing embodiment, with the result that sensitivities for the smoothing operation are mutually different (refer to FIGS. 4 to 7).

The smoothed images Y1(m, n) and Y2(m, n) are sent to the subtracter 25, where both the images Y1(m, n) and Y2(m, n) is subjected to mutual subtraction carried out at each pixel. Hence, the subtracter 25 is able to, as explained with the formula (3), output difference values S(m, n) (i.e, difference image) based on a formula of S(m, n)=Y1(m, n)–Y2(m, n). Absolute values Z(m, n)=abs(S) may also be calculated as described before.

The difference values S(m, n) are outputted to the weighting calculator 26, where weighting coefficients "A" corresponding to the inputted difference values S(m, n) are read out from the data table 27. In the data table 27, data indicative of a correspondence between the difference values S and the weighing coefficients "A" are memorized beforehand. The correspondence complies with a weighting function determined as shown in FIG. 10, for example. Hence, the weighting adder 26 is able to use the difference values S as a parameter to read out corresponding weighing coefficients "A." The read-out weighting coefficients "A" are outputted to the weighing calculator 26.

Because of this, the weighting calculator 26 carries out the weighting addition on the foregoing formula (5) to provide data of a weighting-added image W(m, n).

As a result, even when the image processing apparatus 20 is configured by mutually combining the digital circuits, the apparatus 20 is able to have the identical functions and advantages to the foregoing image processing apparatus 10 in which the software is installed to provide the image processing functions. In addition, this image processing apparatus 20 can be solely incorporated into, for example, various types of medical modalities, such as diagnostic ultrasound apparatuses. While such a medical modality acquires digital image data, the digital image data can be transformed into noise-reduced image data in almost real time.

Third Modification

In a third medication, another original image is exemplified, which is used directly for the weighting addition.

Though the foregoing embodiment has employed both an original image and its smoothed image as images to be subjected to the weighting addition, another image can be used for such weighting addition. For example, in place of the original image, an image produced by enhancing high-frequency signal components of the original image can be used.

Figure 13:
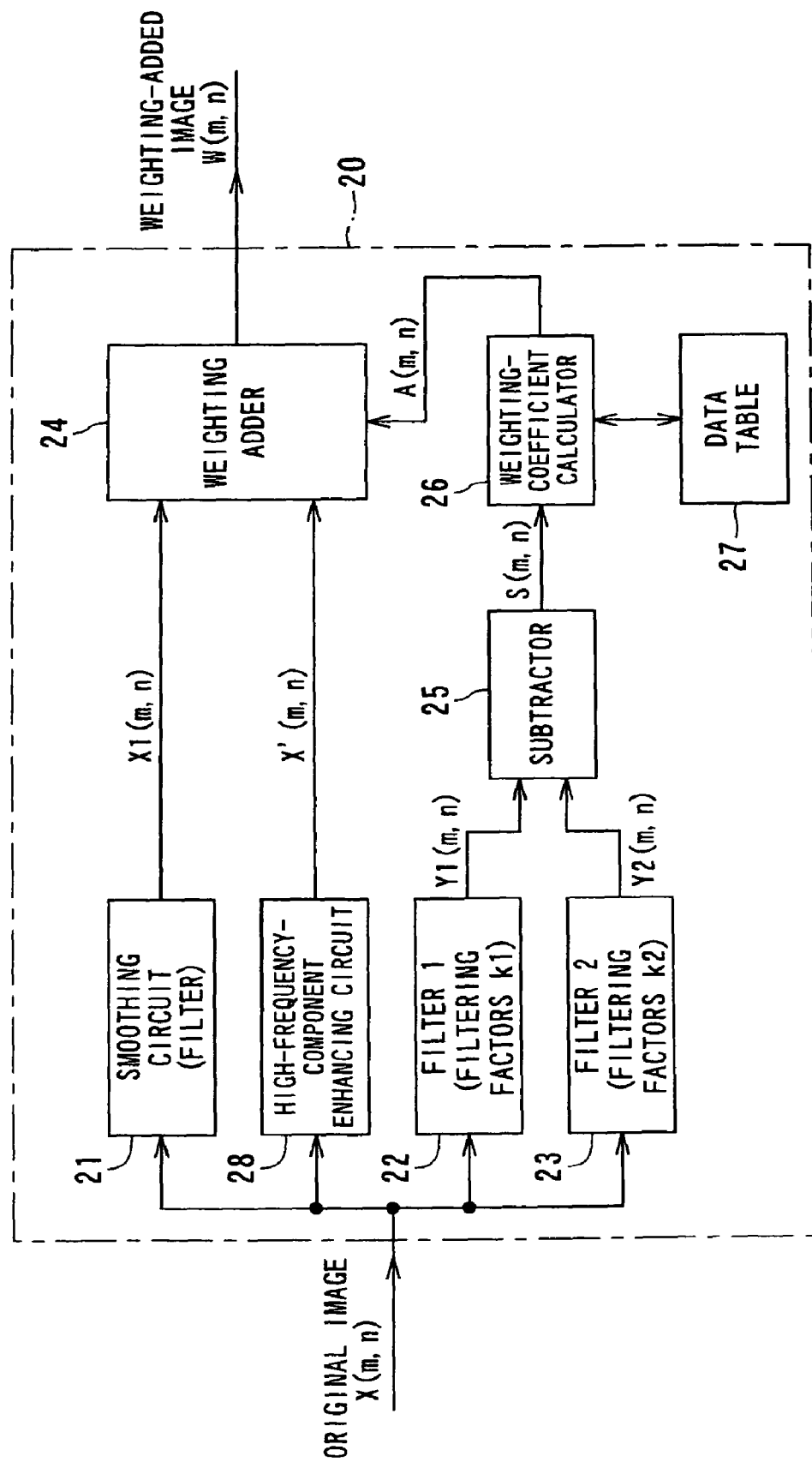
FIG. 13 is a functional block diagram showing the hardware configuration of an image processing apparatus according to a third modification of the embodiment.

The hardware configuration of an image processing apparatus for this purpose is exemplified in FIG. 13. This figure is depicted as a functional block diagram of the image processing apparatus 20 formed with the digital circuits, like the circuitry shown in FIG. 12.

This image processing apparatus 20 has, as shown, an additional circuit 28. This circuit 28 is formed as a high-frequency component enhancing circuit 28 producing, from an inputted original image X(m, n), an image X'(m, n) of which high-frequency signal components are enhanced. On this enhanced image, the contours of such structural objects as bones are visually enhanced.

Data of the resultant high-frequency-component-enhanced image X'(m, n) is then sent to the weighting adder 24, where both of this enhanced image X'(m, n) and a smoothed image X1(m, n) obtained in the same manner as the foregoing embodiment are subject to weighting addition in the similar way to that in the foregoing embodiment. That is, this addition is executed in a condition in which X(m, n) in the foregoing formula (5) is replaced by X'(m, n).

Thus, in the resultant weighting-added image W(m, n), regions exhibiting high-frequency components, such as the contours (edges) of structural objects, are exaggerated, thereby further improving the visibility of the image W(m, n).

Fourth Modification

A fourth embodiment concerns the dimension of an image to be subjected to noise reduction according to the present invention.

The description in the foregoing embodiment has been directed to, as the original image, a two-dimensional monochrome digital image. The present invention is always not limited to handling such an image. The noise reduction according to the present invention may also be applied to a three-dimensional monochrome digital image as the original image.

In order to perform the noise reduction on such a three-dimensional digital image, the two-dimensional ROI shown in FIG. 5 is changed to a three-dimensional ROI as shown in FIG. 14. For this the 3-D ROI, each of the distances in the three-dimensional directions extending from the ROI center is made to undergo the calculation that uses the weighting coefficients decided based on the foregoing filters 1 and 2. This permits the weighing coefficients to have a three-dimensional distribution. Like the foregoing, the filtering factors of the filters 1 and 2 are given gradually-decreasing distributions with regard to each distance L from the ROI center.

Hence, a smoothed image, which is one input image to the weighting addition, is produced from the three-dimensional image (original image) by a filter having three-dimensional filtering factors. Like the manner described with FIG. 11, an image processing apparatus performs the weighting addition between the three-dimensional original image (or its high-frequency-component-enhanced image) and the smoothed image thereof.

As understood from the above, for the three-dimensional digital image serving as the original image, the calculation can be executed in the same manner as that for the two-dimensional image. It is therefore possible to reduce or remove noise from an image (namely, as shown in FIG. 14, a two-dimensional image reconstructed from noise-removed three-dimensional digital image data). In addition, information indicative of the contours of structural objects remains distinctively. The visibility is thus improved steadily.

Figure 15:
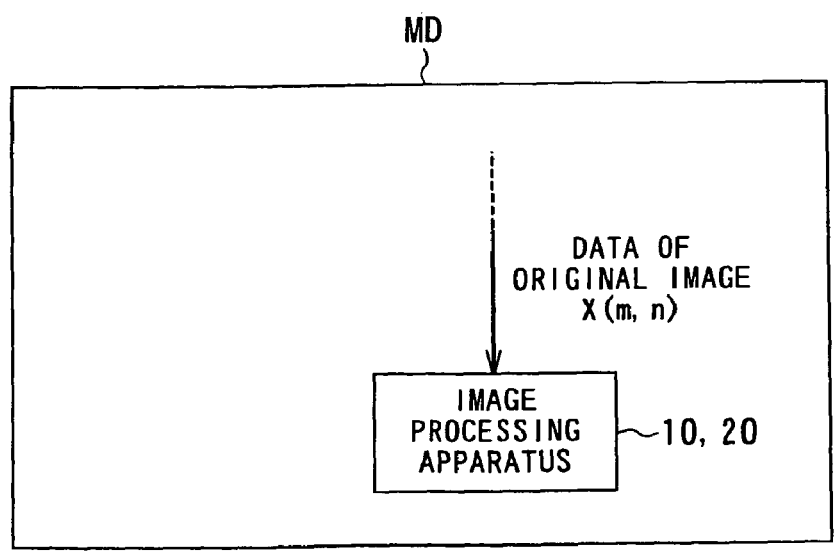
FIG. 15 is an outlined block diagram showing, as a further modification, an X-ray CT scanner to which the present invention is applied.

In particular, when the noise removal according to the foregoing embodiments and modifications is applied to digital images acquired by medical modalities, the following advantages are obtained as well. FIG. 15 outlines a medical modality MD, such as X-ray CT (Computed Tomography) scanner or diagnostic ultrasound apparatus, in which the foregoing image processing apparatus 10 or 20 is incorporated to receive data of an original image X(m, n) acquired by an acquisition portion of the modality.

For the application to X-ray CT images, both of the noise reduction and the steady edge depictions of structural objects makes it possible that an amount of X-ray radiation is lowered than the conventional, with a diagnostic performance as high as the conventional still maintained. This fact will lead to a decrease or suppression in an amount of X-ray to be radiated. Furthermore, for the application to an ultrasound image, speckle noise, which has yet to be removed by the conventional manner, can be reduced steadily, providing images of highly improved visibility in terms of structural objects on the images.

Incidentally, there is provided a further application according to the foregoing embodiment and its various modifications. That is, in X-ray CT imaging or other types of imaging, the foregoing noise reduction technique can be combined with others. For example, the noise reduction technique according to the present invention can be conducted in combination with a RASP (Raster Artifact Suppression Protocol) technique. This technique, which is executable for X-ray CT imaging for the chest region, is selective noise processing depending on data acquisition angles. In the X-ray CT imaging, by way of example, a pair of an X-ray tube and an X-ray detector is rotated around an object to be scanned, during which time data acquisition is carried out at predetermined angles. In this situation, if there is a difference in an X-ray absorption coefficient of the same region of the object between the data acquisition angles of 90 and 180 degrees, artifacts may appear on a reconstructed image. To reduce those artifacts, it is frequent to selective noise reduction is employed. Hence, this selective noise reduction can be conducted in combination with the noise reduction according to the present invention. Employing both the noise reduction technique in this way will provide reconstructed CT images from which artifacts and noise are reduced with steadiness, thus providing high-quality CT images.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2003-035727 filed on Feb. 13, 2003 including the specification, claims, drawings and summary is incorporated herein by reference in its entirety.

What is claimed is:

1. An image processing apparatus for reducing noise from one original image consisting of digital image data, comprising:
 an information calculator configured to determine changes in pixel values in predetermined areas on said original image, and calculate information that indicates largeness of spatial changes of the values for each of respective pixels;
 a smoothed image producer configured to calculate a smoothed image by smoothing said original image;
 a high-frequency component enhancer configured to produce an enhanced image by enhancing a comparatively high-frequency component in said original image;
 a weighting-factor calculator configured to calculate a respective weighting factor depending on the calculated information for each of said respective pixels; and
 a weighting adder configured to mutually perform, using the weighting factor, a weighting addition between the enhanced image and the produced smoothed image, where
 the information calculator comprises:
 a filtering unit configured to respectively apply two smoothing filters of mutually different filtering factors to said original image respectively, thereby to produce two smoothed output images; and
 a subtraction unit configured to perform mutual subtraction, pixel by pixel, between the two smoothed output images, thereby to produce a difference image from which the information that indicates said largeness of spatial change is derived.

2. The image processing apparatus according to claim 1, wherein the information calculator comprises an absolute-value calculator configured to calculate an absolute value of each pixel value of the difference image, thereby to produce an absolute-value image serving as the information that indicates said largeness of spatial change.

3. The image processing apparatus according to claim 1, wherein the filtering factors of the two smoothing filters are defined based on an algorithm that the larger the absolute value of each pixel value of the difference image, the larger the spatial change in the pixel value averaged every predetermined area on either said original image or an image modulated from said original image.

4. The image processing apparatus according to claim 1, wherein the smoothed image producer is configured to use, as the smoothed image, one of the two output images smoothed by the filtering unit.

5. The image processing apparatus according to claim 1, wherein the weighting factor calculator is configured to calculate a weighting coefficient defined by a non-decreasing function of an absolute pixel value on the difference image, the weighting coefficient having a non-negative value.

6. The image processing apparatus according to claim 1, wherein the weighting adder is configured to perform the weighting addition based on an equation of $$W(m,n) = A \cdot X(m,n) + (1-A) \cdot X1(m,n),$$

wherein the weighting factor is A, a pixel position is (m,n), the enhanced image is X(m,n), the smoothed image is X1(m,n), and an image subjected to the weighting addition is W(m,n).

7. The image processing apparatus according to claim 1, wherein the smoothed image producer is configured to apply a preset smoothing filter to said original image to produce the smoothed image.

8. The image processing apparatus according to claim 1, wherein said original image is a two-dimensional digital image.

9. The image processing apparatus according to claim 1, wherein said original image is a three-dimensional digital image.

10. The image processing apparatus according to claim 1, wherein said original image is a monochrome digital image.

11. A non-transitory computer-readable medium in which is recorded computer program instructions, which when executed by a computer results in performance of image processing steps for reducing noise from one original image consisting of digital image data, the image processing steps comprising:

determining changes in pixel values in predetermined areas on said original image, and calculating information that indicates largeness of spatial changes of the values for each of respective pixels;

producing a smoothed image by smoothing said original image;

producing an enhanced image by enhancing a comparatively high-frequency component in said original image;

calculating a respective weighting factor depending on the calculated information for each of said respective pixels; and performing, using the weighting factor, a mutual weighting addition between the enhanced image and the produced smoothed image, wherein the step of calculating information comprises:

respectively applying two smoothing filters of mutually different filtering factors to said original image respectively, thereby producing two smoothed output images; and performing mutual subtraction, pixel by pixel, between the two smoothed output images thereby producing a difference image from which the information that indicates largeness of spatial change is derived.

12. A method of reducing noise from one original image consisting of digital image data, the method comprising the steps of:

producing a smoothed image by smoothing said original image;

applying to said original image two smoothing filters having mutually different filtering factors, respectively, to produce two smoothed output images;

performing a mutual subtraction between the two smoothed output images pixel by pixel to produce a difference image;

calculating a weighting factor depending on either the difference image or an image derived from the difference image;

producing an enhanced image by enhancing a comparatively high-frequency component in said original image; and performing, using the calculated weighting factor, a mutual weighting addition between the enhanced image and the produced smoothed image.

13. The method according to claim 12, wherein the image derived from the difference image is an absolute-value image consisting of absolute pixel values formed from pixel values of the difference image.

14. The method according to claim 12, wherein the filtering factors of the two smoothing filters are defined based on an algorithm that the larger a change in an pixel value of either said original image or the image derived from said original image, the larger an absolute value of an pixel value of the difference image.

15. The method according to claim 12, wherein the weighting factor calculating step calculates a weighting coefficient defined by a non-decreasing function of an absolute pixel value on the difference image, the weighting coefficient having a non-negative value.

16. The method according to claim 12, wherein the weighting adding step performs the weighting addition based on an equation of $$W(m,n) = A \cdot X(m,n) + (1-A) \cdot X1(m,n),$$

wherein the weighting factor is A, a pixel position is (m,n), the enhanced image is X(m,n), the smoothed image is X1(m,n), and an image subjected to the weighting addition is W(m,n).

* * * * *